United States Patent
Adamson et al.

(10) Patent No.: US 6,847,126 B2
(45) Date of Patent: Jan. 25, 2005

(54) SYSTEM AND METHOD FOR HARVESTING ELECTRIC POWER FROM A ROTATING TIRE'S STATIC ELECTRICITY

(75) Inventors: John David Adamson, Simpsonville, SC (US); George Phillips O'Brien, Piedmont, SC (US)

(73) Assignee: Michelin Recherche et Technique S.A., Route Louis-Braille (CH)

( * ) Notice: Subject to any disclaimer, the term of this patent is extended or adjusted under 35 U.S.C. 154(b) by 134 days.

(21) Appl. No.: 10/374,936

(22) Filed: Feb. 25, 2003

(65) Prior Publication Data

US 2004/0164558 A1 Aug. 26, 2004

(51) Int. Cl.[7] .............................................. G01M 17/02
(52) U.S. Cl. .................................. 290/1 R; 152/152.1
(58) Field of Search ...................... 290/1 R; 152/152.1; 340/442

(56) References Cited

U.S. PATENT DOCUMENTS

| | | | |
|---|---|---|---|
| 3,760,351 A | | 9/1973 | Thomas |
| 4,004,271 A | | 1/1977 | Haven et al. |
| 4,061,200 A | | 12/1977 | Thompson |
| 4,504,761 A | * | 3/1985 | Triplett ........................ 310/339 |
| 4,510,484 A | | 4/1985 | Snyder |
| 4,742,857 A | | 5/1988 | Gandhi |
| 4,862,486 A | | 8/1989 | Wing et al. |
| 5,248,930 A | * | 9/1993 | Taylor .......................... 322/2 A |
| 5,348,067 A | * | 9/1994 | Myatt ....................... 152/152.1 |
| 5,397,616 A | | 3/1995 | Aoki |
| 5,457,447 A | | 10/1995 | Ghaem et al. |
| 5,520,231 A | * | 5/1996 | Myatt ....................... 152/152.1 |
| 5,616,196 A | | 4/1997 | Loewe |
| 5,749,984 A | * | 5/1998 | Frey et al. ................... 152/415 |

(List continued on next page.)

FOREIGN PATENT DOCUMENTS

| | | | | |
|---|---|---|---|---|
| EP | 0798142 | | 10/1997 | |
| EP | 963302 B1 | * | 10/2001 | ........... B60C/11/18 |
| FR | 2775220 A1 | * | 8/1999 | ........... B29C/47/06 |
| JP | 1120409 | | 1/1999 | |
| JP | 1120426 | | 1/1999 | |
| JP | 11034611 | | 2/1999 | |
| JP | 11034612 | | 2/1999 | |
| JP | 11048711 A | * | 2/1999 | ........... B60C/11/00 |
| JP | 11048711 | | 2/1999 | |
| JP | 11115414 | | 4/1999 | |
| JP | 11227415 | | 8/1999 | |
| WO | 9838050 | | 9/1998 | |
| WO | 9943505 | | 9/1999 | |

OTHER PUBLICATIONS

Measurement procedure for electrical discharge resistance of pneumatic tires under pressure, Employer's Association German Rubber Industries, e.V., Feb. 1997.

Primary Examiner—Joseph Waks
(74) Attorney, Agent, or Firm—Dority & Manning, P.A.

(57) ABSTRACT

A power harvesting solution concerns a generally non-conductive tire structure that is formed with at least one defined conductivity path through which static electricity accumulated in the tire structure during tire rotation can dissipate to ground. Such conductivity path is formed from a portion of conductive material that may be partially surrounded by additional insulative material to restrict the flow of electric charge to ground. An energy storage device, such as a capacitor or rechargeable battery, is coupled with the conductivity path and configured to store selected amounts of the electric charge dissipating through the conductivity path. Various diode elements may be provided in combination with the energy storage device to prevent reverse discharging of and to provide voltage protection for the energy storage device. Sufficient accumulations of such harvested energy can then power tire electronic systems, including various condition-responsive devices (i.e., sensors, etc.) a revolution counter, a radio frequency (RF) device, a rechargeable battery or a lighting device.

30 Claims, 7 Drawing Sheets

U.S. PATENT DOCUMENTS

| | | | |
|---|---|---|---|
| 5,781,104 A * | 7/1998 | Huang | 340/442 |
| 5,835,027 A * | 11/1998 | Tyburski et al. | 340/933 |
| 5,928,444 A | 7/1999 | Loewe et al. | |
| 5,937,926 A | 8/1999 | Powell | |
| 5,942,069 A | 8/1999 | Gerresheim et al. | |
| 6,175,302 B1 * | 1/2001 | Huang | 340/442 |
| 6,220,319 B1 | 4/2001 | Reuter | |
| 6,255,940 B1 * | 7/2001 | Phelan et al. | 340/447 |
| 6,269,854 B1 | 8/2001 | Matsuo et al. | |
| 6,289,958 B1 | 9/2001 | Dheur et al. | |
| 6,367,525 B1 | 4/2002 | Hiruma et al. | |
| 6,725,713 B2 * | 4/2004 | Adamson et al. | 73/146.5 |
| 6,748,797 B2 * | 6/2004 | Breed et al. | 73/146 |

* cited by examiner

SYSTEM AND METHOD FOR HARVESTING ELECTRIC POWER FROM A ROTATING TIRE'S STATIC ELECTRICITY

FIELD OF THE INVENTION

The present invention generally concerns tire electronics assemblies that are self-powered via charges that accumulate during conventional tire rotation. More particularly, a pneumatic tire structure with generally non-conductive portions may be constructed with at least one electrically conductive segment formed through the tire structure and tread portion to provide a channel through which built-up static electricity can dissipate to ground while some of the channeled static electricity is simultaneously captured in an energy storage device. Sufficient accumulations of such harvested energy can then power tire electronic systems, including various condition-responsive devices (i.e., sensors, etc.), radio frequency (RF) transmitters, and other components.

BACKGROUND OF THE INVENTION

The incorporation of electronic devices with pneumatic tire structures yields many practical advantages. Tire electronics may include sensors and other components for relaying tire identification parameters and also for obtaining information regarding various physical parameters of a tire, such as temperature, pressure, number of tire revolutions, vehicle speed, etc. Such performance information may become useful in tire monitoring and warning systems, and may even potentially be employed with feedback systems to regulate proper tire pressure levels.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system. U.S. Pat. No. 4,862,486 (Wing et al.) also relates to tire electronics, and more particularly discloses an exemplary revolution counter for use in conjunction with automotive and truck tires. Examples of aspects of tire pressure monitoring systems are disclosed in U.S. Pat. No. 4,004,271 (Haven et al.), U.S. Pat. No. 4,742,857 (Gandhi), U.S. Pat. No. 5,616,196 (Loewe), and U.S. Pat. No. 5,928,444 (Loewe et al.).

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth mining equipment. Entire fleets of vehicles could be tracked using RF tag transmission, exemplary aspects of which are disclosed in U.S. Pat. No. 5,457,447 (Ghaem et al.).

Such integrated tire electronics systems have conventionally been powered by a variety of techniques and different power generation systems. Examples of mechanical features for generating energy from tire movement are disclosed in U.S. Pat. No. 4,061,200 (Thompson) and U.S. Pat. No. 3,760,351 (Thomas). Such examples provide bulky complex systems that are generally not preferred for incorporation with modern tire applications. Yet another option for powering tire electronics systems is disclosed in U.S. Pat. No. 4,510,484 (Snyder), which concerns a piezoelectric reed power supply symmetrically configured about a radiating center line of a tire.

Another typical solution for powering tire electronics systems corresponds to the use of a non-rechargeable battery, which inherently provides an inconvenience to the tire user since proper electronics system operation is dependent on periodic battery replacement. Conventional batteries also often contain heavy metals that are not environmentally friendly and which present disposal concerns, especially when employed in highly numerous quantities. Still further, batteries tend to deplete their energy storage quite rapidly when powering electronic applications characterized by complex levels of functionality. Battery storage depletion is especially prevalent in electronic systems that transmit information over a relatively far distance such as from truck wheel locations to a receiver in the truck cabin. Even when batteries are used in electronics systems that transmit from wheel locations to a closer receiver location, information is then typically relayed via hard-wire transmission medium from the RF receiver location to the vehicle cab thus requiring the installation of additional and often expensive communications hardware in a vehicle.

Yet another known method for deriving power for tire monitoring systems relates to scavenging RF beam power with an interrogation antenna in close proximity to a tire and integrated electronic features. Energy that is radiated from the antenna is scavenged to power the electronics, which must often be very specialized ultra-low-power electronics limited to within a few microwatts. Interrogation antennas employed in conjunction with beam-powered electronics must typically be placed in relatively close proximity (within about two feet) to each wheel well due to limited transmission ranges. This typically requires multiple interrogation antennas per vehicle, thus adding to potential equipment costs. Each antenna is also quite susceptible to damage from road hazards, and thus for many reasons may not be the most desirable solution for powering certain tire electronic applications.

Many known methods for harvesting power and providing power to tire electronics systems exist. However, aspects of such known technologies may be undesirable in certain tire applications. As such, it is desirable to provide an improved method for harvesting electric power for tire electronics applications.

In further accordance with the present subject matter, it is appreciated that certain electrical properties are inherently associated with tire structures. For instance, moving vehicles and tire assemblies provided in conjunction thereto experience a build-up of static electricity. Unless a grounding path is provided, moving vehicles experience a build-up of static electricity that can be of relatively high voltage. Such charge build-up is undesirable for a number of reasons. For example, the presence of such a charge can produce a source of interference for and thus an adverse effect on the vehicle's electronic circuitry including radio reception. Excess charge can also create a spark potential that can present a safety hazard during refueling. Furthermore, the grounding of a charge through a vehicle occupant, typically upon entering or exiting the vehicle, can be particularly uncomfortable.

Tires can be used to provide a ground that dissipates the buildup of static electricity within a vehicle. However, not all materials that might be used in tire construction are necessarily electrically conductive. Rubber compositions that are electrically conductive are generally constructed from compounds having significant proportions of carbon black. Conversely, rubber compositions that are relatively nonconductive tend to have significantly larger amounts of silica relative to carbon black. In general, increasing the relative proportion of silica relative to carbon black decreases tire conductivity.

While silica-based compositions are generally poor conductors of electricity, the use of silica as a reinforcing material in the tread portion of a tire can provide increased braking ability under wet conditions and also can result in a tire having decreased rolling resistance. Accordingly, methods of providing a path of conductivity through an electrically insulating tire tread have been suggested. For example, see U.S. Pat. No. 5,937,926 (Powell), U.S. Pat. No. 6,220,319 and (Reuter), U.S. Pat. No. 6,269,854, which are hereby fully incorporated into this application for all purposes by reference thereto.

In recognition of the need for power generation and static electricity dissipation, in at tire environment, the provision of various electrically conductive paths in accordance with the present invention may offer dual functionality for vehicular applications in a tire for purposes in addition to providing a grounding path for static electricity buildup. Since it is desirable in many instances that electronic components associated with a tire structure be outfitted with some sort of power source, the buildup of static electricity within a tire is channeled and stored for powering such electronic components. Although known methods for power harvesting and for dissipation of static electricity associated with a tire structure have been respectively developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved system and method for powering electronic systems integrated within a tire structure have been developed. A pneumatic tire structure with generally non-conductive portions may be constructed with at least one electrically conductive segment formed radially through the tire structure to provide a channel through which built-up static electricity can dissipate to ground while some of the channeled static electricity is simultaneously captured in an energy storage device. Sufficient accumulations of such stored energy can then power various electronic components associated with a tire assembly, such as rechargeable batteries, various condition-responsive devices and radio frequency (RF) transceivers.

In accordance with more particular aspects of the disclosed technology, it is an object of the present subject matter to provide a pneumatic tire with integrated self-powered electronic components. Such electronic components receive power from electric charge stored as a result of channeled static electricity from within a wheel assembly, and may correspond to a variety of devices such as a rechargeable battery, a revolution counter, an active RFID transponder, etc. A still further electronic application concerns an electronics assembly designed to measure and transmit information regarding tire conditions such as pressure and temperature, as well as other information such as the number of tire revolutions or general tire identification variables.

In accordance with additional aspects of the disclosed technology, it is an object of the presently disclosed technology to provide a power generation device for tire electronic components that employs electrically conductive paths formed through a tire structure. Such electrically conductive paths offer a way to dissipate static electricity that may accumulate within a tire assembly having portions constructed with relatively high resistance materials. By capturing and storing the electric charge that is channeled through such electrically conductive paths, a power source for tire electronic components is effected.

Various features and aspects of the subject tire electronics system and specialized power harvesting technology offer a plurality of advantages. The disclosed technology provides for a self-powered tire electronics system that is not dependent on replacement of batteries. Although batteries and battery-operated devices may still be incorporated with aspects of the present subject matter, many complications regarding tire electronics that are solely powered by batteries are obviated in accordance with the disclosed technology.

Another advantage of the present subject matter is that a tire monitoring system is provided that reduces the amount of required signal hardware relative to conventional tire monitoring systems. By providing a tire monitoring system that is self-powered, no scavenger antennas or multiple receiver locations with additional hardwire connections are required. Components of such a tire monitoring system can be integrated within each individual tire structure on a given vehicle such that a single receiver (typically located in a vehicle cabin) is capable of acquiring information transmitted by each tire's integrated electronics.

Yet another advantage of the present subject matter is that there are fewer limitations regarding the type and amount of electronic equipment capable of utilization within tire and wheel assembly structures. Tire electronics powered by some conventional methods are often limited to ultra-low power devices. Devices in accordance with the disclosed technology are not necessarily subject to such extreme power limitations. This advantage further facilitates greater functionality of tire electronics, as more components and/or higher-level equipment may potentially be utilized.

A still further advantage of the present subject matter is that the disclosed system and method for generating power and utilizing such power can be used in accordance with a variety of existing applications. Measurement capabilities, monitoring and warning systems, vehicle feedback systems, and asset tracking potential may be possible for applications such as commercial truck fleets, airplanes, and mining/earthmover equipment.

In one exemplary embodiment of the present subject matter, a tire assembly configured to store electric charge accumulated during rotation of a pneumatic tire structure includes a tire structure, a portion of conductive material, and an energy storage device. More particularly, the tire structure is characterized by a crown having an exterior tread portion for making contact with a ground surface, bead portions for seating the tire structure to a wheel rim, sidewall portions extending between each bead portion and the crown, and an inner lining. The portion of conductive material is interposed in the space between the inner lining and the exterior tread portion, and at least partially forms a conductivity path through which electric charge accumulated in the tire structure can flow to a ground surface in contact with the exterior tread portion. The energy storage device, such as a capacitor or a rechargeable battery, is coupled to the portion of conductive material for further forming the conductivity path through which electric charge accumulations can flow and for storing a selected amount of such electric charge.

Additional embodiments of the present technology may include selected features of the aforementioned exemplary embodiment in combination with various other elements. For instance, additional embodiments may also include selected diode elements in combination with the energy storage device. One such diode may be provided in series with the energy storage device to prevent electric charge stored in the energy storage device from reverse discharging therefrom. Another such diode corresponds to a zener diode provided in parallel with the energy storage device to provide overvoltage protection for the energy storage device by providing an alternate conductivity path in the tire structure. Conductivity paths provided by portions of conductive material and associated power harvesting circuitry may be further restricted by the provision of insulating material around the conductivity paths. Once energy is harvested from a tire's static electricity, it may be used to power other components associated with a tire, such as a condition-responsive device, a radio frequency (RF) transmitter, a microcontroller, etc.

Another exemplary embodiment of the present technology concerns a tire assembly with self-powered electronic components that includes a pneumatic tire structure, at least one portion of conductive material, and at least one electronic component. The pneumatic tire structure may be characterized by a crown having an exterior tread portion for making contact with a ground surface, bead portions for seating the pneumatic tire structure to a wheel rim, sidewall portions extending between each bead portion and the crown, and an interior surface. The at least one portion of conductive material extends between the interior surface and the exterior tread portion of the pneumatic tire structure for at least partially form-Ling a conductivity path through which electric charge accumulated in the pneumatic tire structure can flow to a ground surface in contact with the exterior tread portion. The at least one electronic component is preferably coupled to the conductivity path and powered by the electric charge that flows through such path. The at least one electronic component may correspond to a revolution counter, a condition-responsive device, or other component. It should be appreciated that various combinations of components may also be powered by the channeled electric charge.

A still further embodiment of the present subject matter relates to a method for harvesting power from a rotating tire's static electricity. Such a method may include the step of providing a tire structure characterized by a crown having a tread portion for making contact with a ground surface, bead portions for seating the tire structure to a wheel rim, sidewall portions extending between each bead portion and the crown, and an inner liner. The provided tire structure also preferably includes at least one portion of conductive material interposed between the inner liner and the tread portion for forming a conductivity path through which electric charge accumulated in the tire structure can flow to a ground surface in contact with the tread portion. An additional step associated with the subject power harvesting methodology involves rotating the tire structure such that the exterior tread portion of the tire structure is in contact with a ground surface. Such rotating step preferably generates static charge within the tire structure that subsequently flows through the at least one portion of conductive material. A final step associated with such exemplary power harvesting method corresponds to storing some of the static charge generated in said rotating step in an energy storage device, such as a capacitor or a rechargeable battery.

Additional objects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
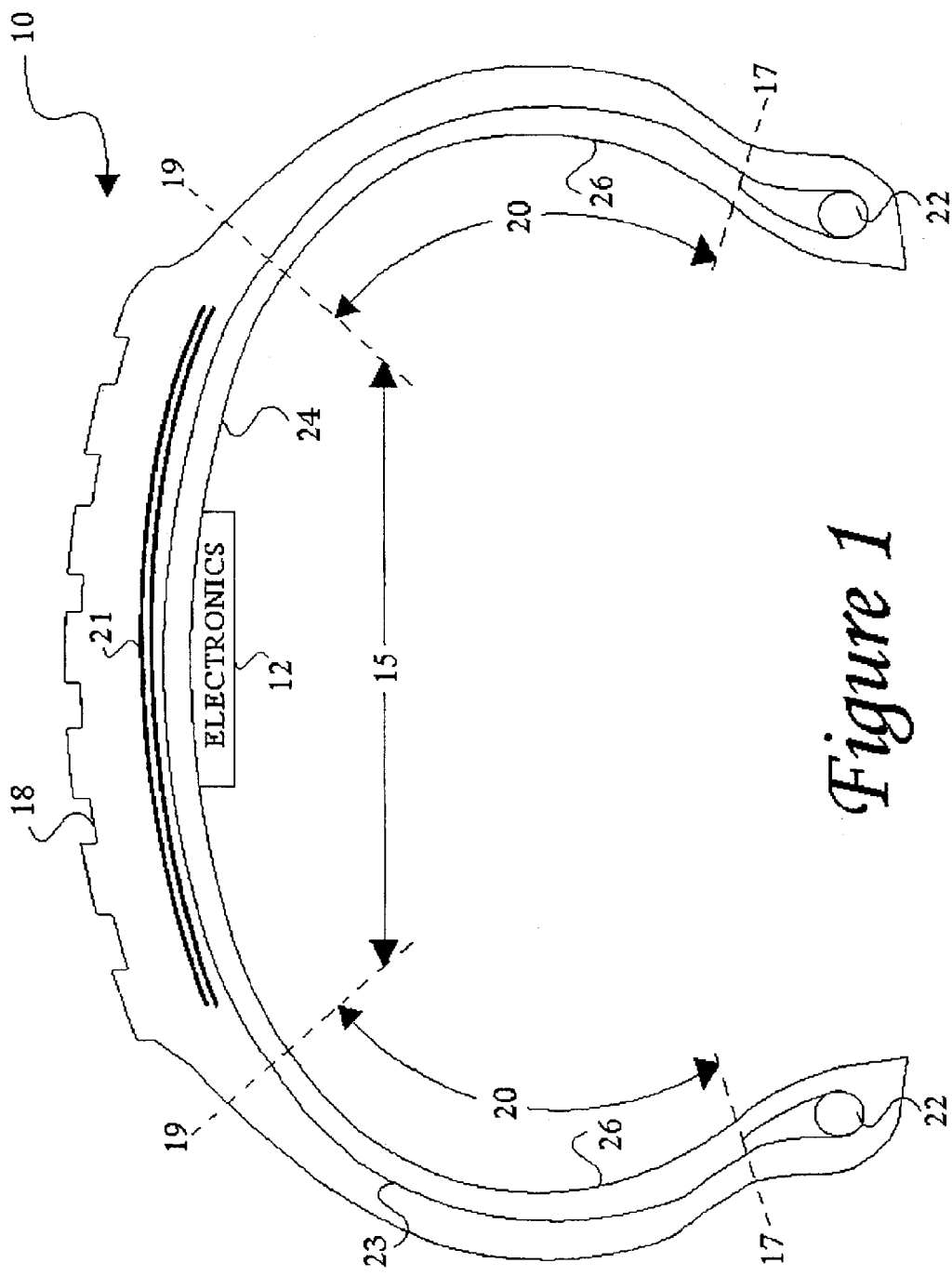
FIG. 1 displays a generally cross-sectional view of an exemplary pneumatic tire structure.

Repeat use of reference characters throughout the present specification and appended drawings is intended to represent same or analogous features or elements of the invention.

DETAILED DESCRIPTION OF THE PREFERRED EMBODIMENTS

As discussed in the Brief Summary of the Invention section, the present subject matter is particularly concerned with a system and method for harvesting power within a tire structure while simultaneously providing features to dissipate the buildup of electric charge from a tire structure. Sufficient accumulations of the harvested electric charge can then be used to power electronic systems, examples of which include components for identifying various physical tire parameters as well as radio frequency (RF) transmission devices and others.

Features for dissipating the buildup of static electricity from within a tire structure include portions of conductive material interposed between the inner and outer surfaces of a tire structure. Exemplary aspects of such portions of conductive material and their association with a tire structure are illustrated with respect to FIGS. 1–3. An energy storage device and other power harvesting circuitry for use with a conductivity path as defined by portions of conductive material within a tire are illustrated with respect to FIGS. 2–4. An example of a tire electronics system, including condition-responsive devices, a microcontroller, and an RF transmitter is presented in FIG. 6. Aspects of exemplary interaction between power harvesting circuitry and a tire electronics system is discussed with reference to FIGS. 5A and 5B, respectively. Finally, an exemplary embodiment of a remote receiver configuration for obtaining information transmitted from an exemplary tire electronics system is presented with respect to FIG. 7.

Selected combinations of the aforementioned aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function. Similarly, certain process steps may be interchanged or employed in combination with other steps to yield additional exemplary embodiments of a method for generating electric power from a rotating tire's mechanical energy.

The capabilities of the subject power harvesting features, as hereafter presented, offer numerous advantages over conventional techniques for providing power within a tire assembly. Antenna beam power scavenging techniques, as previously discussed, are no longer one of limited options to choose from for powering tire electronics. As such, the functional capabilities of many types of tire electronics is generally increased. The option of utilizing batteries for power generation is no longer essential, thus avoiding costly and cumbersome battery replacement. Although the presently disclosed technology provides for power harvesting technology that enables antenna beam power and batteries to be eliminated, it should be appreciated that power harvesting features could include a hybrid combination of storing channeled static electricity and/or batteries and/or antenna beam scavenging to power different selected electronic components within a wheel assembly.

A typical pneumatic tire structure 10 is characterized by a crown 15 which supports an exterior tread portion 18 and sidewalls 20 that extend to bead portions 22. Sidewalls 20 generally extend between section lines 17 and 19 and the tire crown 15 generally extends between the two section lines 19. Tire beads 22 are provided such that the tire structure 10 can be effectively seated to and secured on the rim of a wheel assembly. An inner liner of air-impermeable material forms the interior surface of the tire, including interior crown surface 24 and interior sidewall surfaces 26. A carcass 23 extends between beads 22 across sidewall portions 20 and crown 15, and under inflation pressure defines the tire's shape and transmits forces for traction and steering. Belt package 21 is provided within tire structure 16 generally along the crown 15. As an inflated tire rotates on a vehicle wheel, at least some portion of the exterior tread surface is preferably in continuous contact with a ground surface.

As discussed in the Background of the Invention section, a variety of different materials may be used in the formation of a tire, including different rubber mixtures in the crown, sidewall and tread portions of a tire. Each such tire material may be characterized with a certain level of conductivity, or resistivity (which is inversely proportional to conductivity). Rubber compositions that are electrically conductive are generally constructed from compounds having significant proportions of carbon black. Conversely, rubber compositions that are relatively nonconductive tend to have significantly larger amounts of silica relative to carbon black. In general, increasing the proportion of silica relative to carbon black decreases tire conductivity, but may provide increased braking ability under wet conditions and also can result in a tire having decreased rolling resistance.

Figure 2:
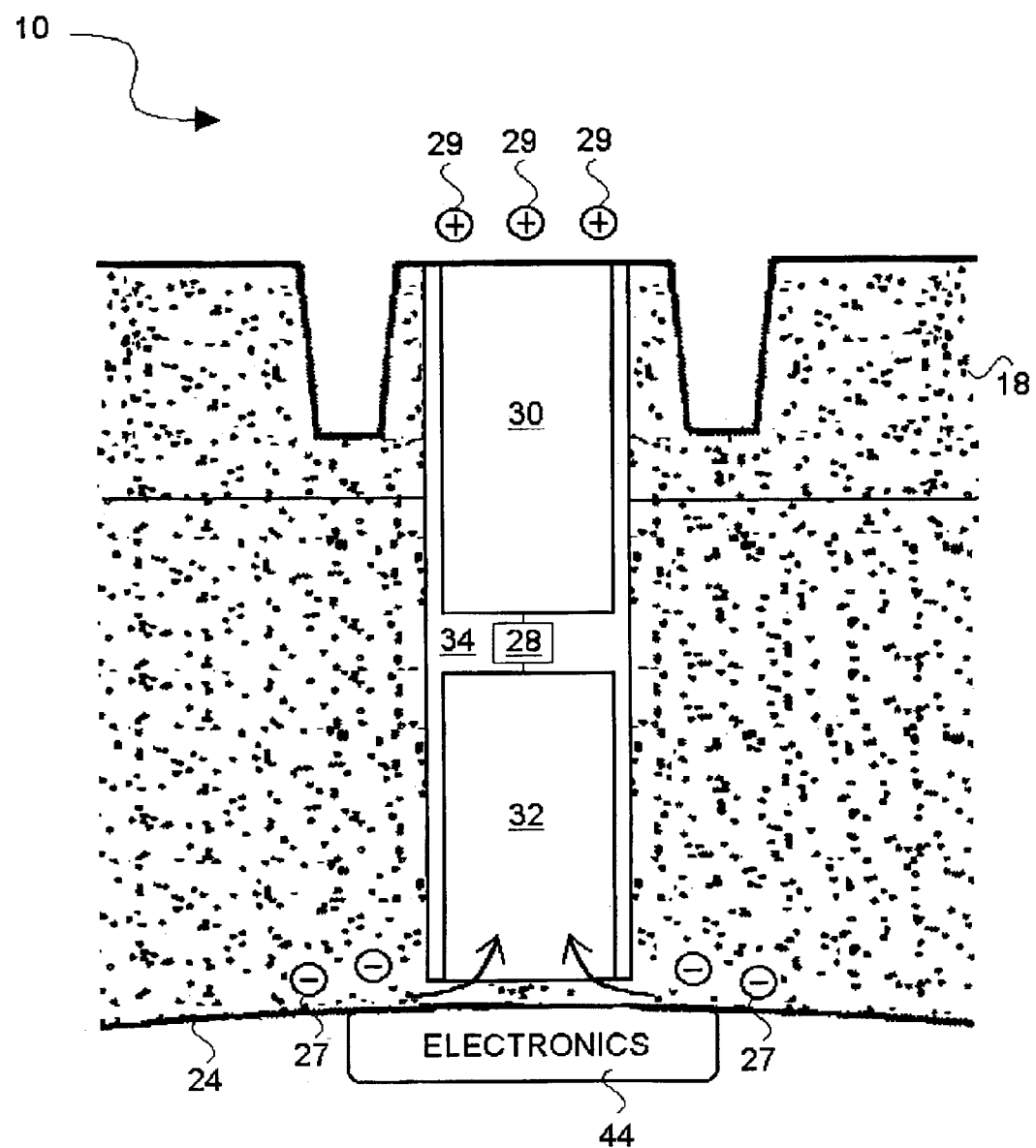
FIG. 2 displays a detailed cross-sectional view of an exemplary embodiment of the present subject matter having a conductive path formed within a tire structure for channeling static charge to an energy storage device and for dissipating static charge to ground.

FIG. 2 illustrates a detailed view of an exemplary tire structure 10 such as in FIG. 1, further including various power harvesting circuitry and electronic components associated therewith. The detailed view of FIG. 2 depicts a portion of the tire crown 15 between exterior tread portion 18 and inner liner along interior crown surface 24. A portion of the tire is formed with a generally nonconductive silica material such that a conductivity path to ground may preferably be included for dissipating any buildup of static electricity within tire structure 10 that may accumulate during conventional tire rotation or other phenomena. As such, a portion of conductive material defined by first conductive segment 30 and second conductive segment 32 is interposed between exterior tread portion 18 and interior surface 24 (or alternatively an interior sidewall surface 26.) As static charge (denoted by negatively-charged particles 27) accumulate in the tire, the charged particles are attracted to positive charges 29 as may exist at a ground surface adjacent to tire structure 10. The portion of conductive material through which such charges may become attracted, as illustrated in FIG. 2, may extend in a radial direction relative to tire structure 10.

Referring still to FIG. 2, an energy storage device 28 is provided in between first segment 30 and second segment 32 such that static charge, or electric charge, flowing through the conductivity path defined by such conductive segments may be stored in energy storage device 28. Energy storage device 28 may correspond in some embodiments to a capacitor, such as an electrolytic capacitor, a super capacitor, or a non-electrolytic capacitor. Energy storage device 28 may also correspond to a rechargeable battery, such as a rechargeable solid-state or chemical battery, in other embodiments. Additional power harvesting circuitry may be provided in combination with energy storage device 28, as will be later discussed. Energy storage device 28 is illustrated between conductive segments 30 and 32, but it should be appreciated that energy storage device 28 may be provided in different positions relative to tire structure 10, and should no way be limiting to the presently disclosed technology. It should be further appreciated that in other embodiments of the present subject matter, two capacitor plates may be formed from the respective opposing surfaces of conductive segments 30 and 32 for yielding an energy storage device.

In order to ensure that accumulated static charge will be stored in energy storage device 28, it is preferred to ensure that the conductivity path to ground is a restricted channel through which the charge will tend to flow as opposed to dissipating at some other location associated with the tire structure. If a majority of the tire rubber is made of a relatively non-conductive rubber, such as one with a surface resistivity of greater than about $10^{12}$ ohms-sq, then the material used in conductive segments 30 and 32 should have a resistivity sufficiently less such that charge will tend to flow through the defined conductivity path. Although in some embodiments the surface resistivity of materials in such a conductivity path may preferably be less than about $10^6$ ohms.sq, materials with a surface resistivity of between about $10^6$ ohms sq and $10^9$ ohms-sq may still allow for the transfer of electric charge to ground or other conductive objects. The portion of conductive material defined by segments 30 and 32 can be a more conductive, or less resistive, rubber material than that generally used in other portions of tire structure 10, or may in other embodiments correspond to wired portions of relatively conductive metal, such as conductive staples or conductive wire. The conductivity path defined by such portion of conductive material may also be formed by some combination of conductive rubber and metal leads.

In some embodiments of the present technology, it may be preferred to further restrict the conductivity path defined by the portion of conductive material by providing an additional portion of insulative material around the area defining the conductivity path to ground. Insulative material 34 may be provided adjacent to first and second conductive segments 30 and 32 as well as surrounding any power harvesting circuitry, such as energy storage device 28, that may be embedded within the tire. Insulative material 34 may be characterized by a surface resistivity of greater than about $10^{12}$ ohms-sq. An example of a suitable insulative material in a tire is a CHEMLOK brand material, such as offered for sale by Lord Manufacturing Corporation, and which may also be utilized to help adhere distinct portions of material together (such as a relatively non-conductive portion of rubber to a relatively conductive portion of rubber or metal.) The provision of insulative material 34 may also help restrict the conductivity path from other potentially conductive portions of a tire such as carcass 23 and belt package 21 (not illustrated in FIG. 2.) In some embodiments, segment 32 and any surrounding insulation may extend through tire 10 to a selected location relative to belt package 21 and/or carcass 23. Additional aspects of forming a conductivity path relative to a tire structure are described in commonly owned patent application with U.S. Ser. No. 10/271,331, entitled "CONDUCTIVITY PATH FOR NON-CONDUCTIVE TIRE TREAD," which is incorporated herein by reference for all purposes.

Figure 3:
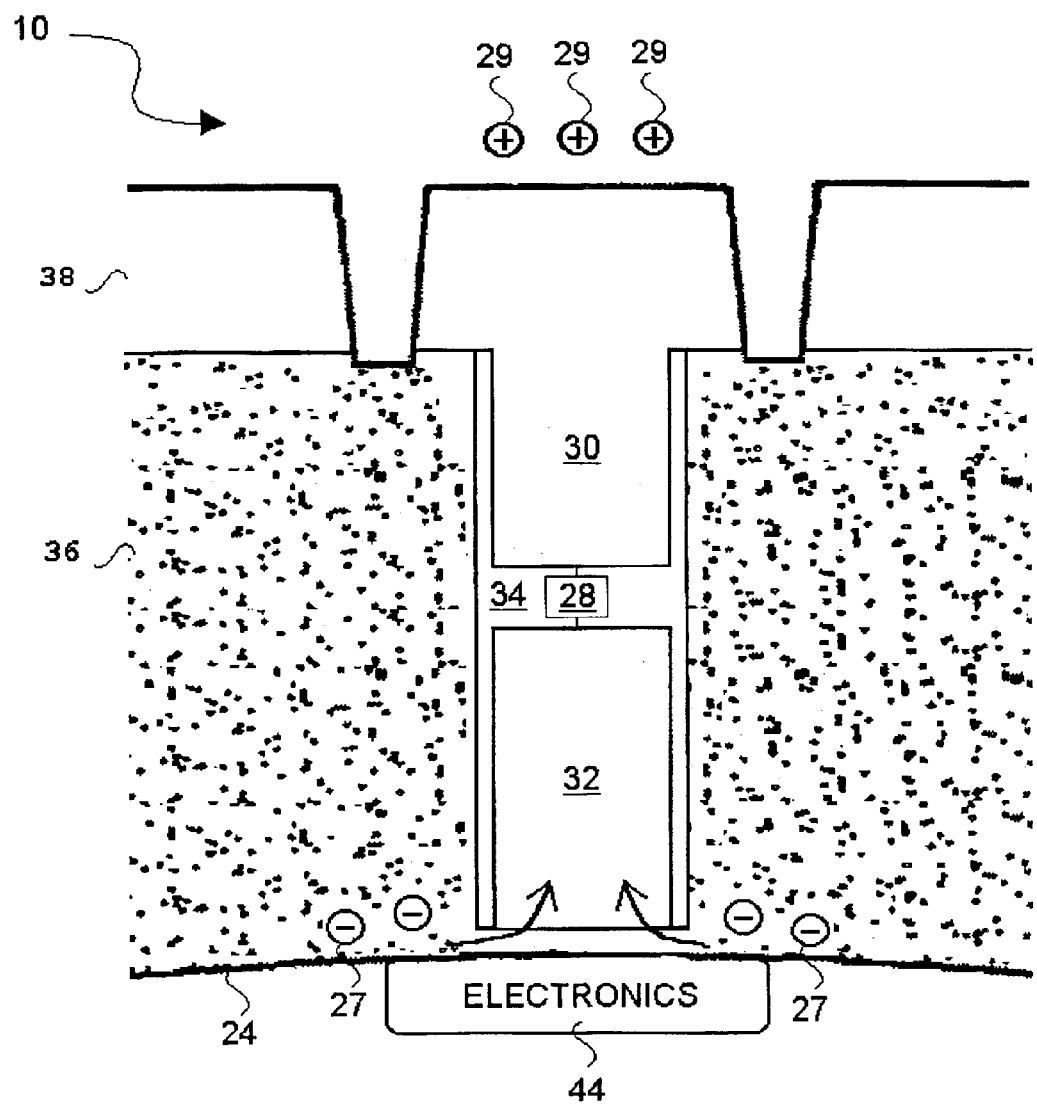
FIG. 3 displays a detailed cross-sectional view of an additional exemplary embodiment of the present subject matter having a conductive path formed within a tire structure for channeling static charge to an energy storage device and for dissipating static charge to ground.

The above commonly owned reference also discloses exemplary tire structure embodiments with additional combinations of conductive and non-conductive rubber materials. FIG. 3 illustrates aspects of one such exemplary embodiment, wherein a tire structure 10 includes a crown and tread portion that consists of a tread base material 36 that is generally non-conductive and a tread cap portion 38 that is generally conductive. In this case, the conductivity path defined by conductive segments 30 and 32 and energy storage device 28 may only need to extend to the conductive tread cap rubber 38. It may be more feasible in the embodiment of FIG. 3 than that of FIG. 2 that conductive portions 30 and 32 correspond to a conductive wire or staple as opposed to a relatively conductive rubber material.

It should be further appreciated that multiple conductive paths may also be utilized in accordance with the disclosed technology, and multiple energy storage devices may be provided in combination with such multiple conductivity paths. Such paths may, for example, be spaced in a direction extending circumferentially around the tire.

Figure 4:
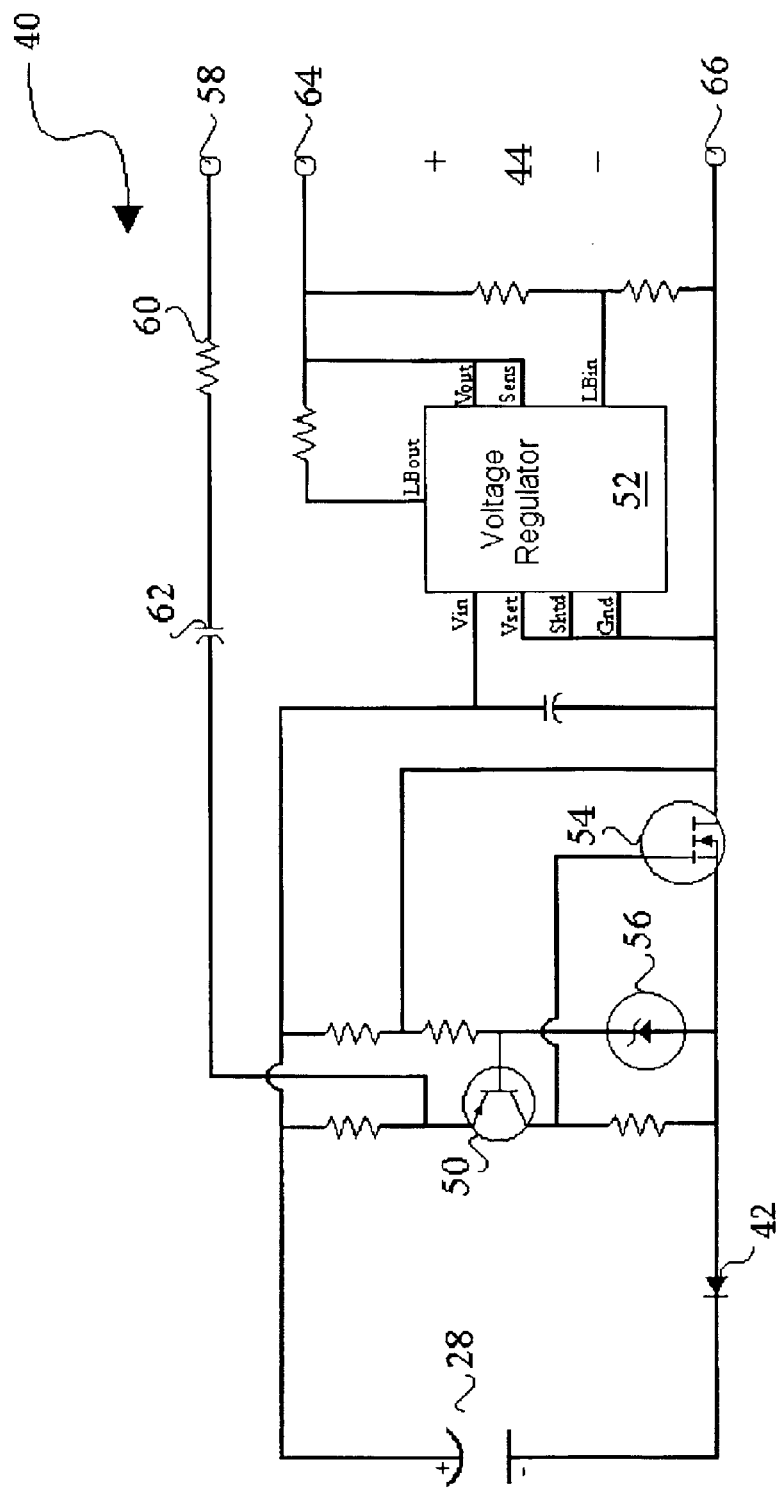
FIG. 4 provides a schematic representation of exemplary power harvesting circuitry in accordance with the present subject matter, for association with an energy storage device.

In accordance with the present subject matter, a conductivity path through which accumulated electric charge may dissipate includes at least one portion of conductive material and an energy storage device 28. Additional power harvesting circuitry may be coupled to the energy storage device to yield a conditioned power source for additional tire electronic components. An exemplary embodiment of additional power harvesting circuitry 40 including energy storage device 28 is schematically illustrated in FIG. 4. Energy storage device 28 may correspond to an electrolytic capacitor, such as a Panasonic TEL series tantalum capacitor with a capacitance of about forty-seven $\mu$Farads. Other types of capacitors, such as super capacitors or non-electrolytic capacitors may similarly be suitable for utilization as energy storage device 28. Energy storage device may also correspond to a rechargeable battery such as a LiteStar brand solid-state rechargeable battery such as offered for sale by Infinite Power Solutions. Other rechargeable solid-state batteries or rechargeable chemical batteries may also be employed as energy storage device 28.

Referring still to FIG. 4, energy storage device 28 is preferably connected in series with a diode 42 to prevent energy storage device 28 from reverse discharging after electric charge has already been stored therein. Diode 42 and energy storage device 28 may be located between conductive segments 30 and 32 and are preferably embedded within tire structure 10. The other components of power harvesting circuitry may also be embedded within the tire structure 10, such as within insulative material 34 or other embedded location within the tire itself. Such power harvesting electronics may also be mounted to the inner lining of a tire structure, such as along the interior crown surface 24 as represented by the electronics module 44 of FIGS. 2 and 3. The electronics module 44 may also include additional components, such as various tire electronics systems as later discussed. Another suitable location for power harvesting electronics is along a selected interior sidewall surface 26. Further, selected components of power harvesting circuitry 40 could be mounted and cured within tire structure 10, for example, between carcass 23 and the inner liner provided along surfaces 24 and/or 26. Power harvesting circuitry and/or additional tire electronics may alternatively be provided adjacent to an additional rubber or elastomer casing before being adhered to or embedded in the tire to provide additional protection. Such casing additionally provides for facilitated mounting of the circuitry to a tire structure. In accordance with the variety of possible locations for power harvesting circuitry 40 and any electronic components powered thereby, it should be understood that the term "integrated" generally encompasses all possible locations, including being mounted on or in a tire structure.

Referring again to FIG. 4, once a sufficient amount of energy has accumulated in energy storage device 28, a bi-polar transistor 50 acts as a switch to release the stored energy in energy storage device 28 to a voltage regulator 52. An example of a voltage regulator suitable for use in the exemplary embodiment of FIG. 3 is a dual-mode five-volt programmable micropower linear voltage regulator such as the MAX666 brand offered for sale by Maxim Integrated Products. Such a voltage regulator may be well suited for electronics systems that may typically have been battery-powered systems, and is able to convert the voltage across energy storage device 28 to a regulated five volt output voltage 44. Other voltage regulators, such as micropower switching regulators, which often have higher efficiency levels than linear regulators, may also be used in accordance with the disclosed technology. A diffusion metal oxide semiconductor (DMOS) FET transistor 54 and zener diode 56 are additionally provided in the exemplary power conditioning module of FIG. 3. Zener diode 56 is provided in parallel with energy storage device 28 to provide overvoltage protection for the energy storage device 28, by limiting the amount of charge stored therein.

Initially, transistors 50 and 54 are off, and the ground at the drain of transistor 54 is floating such that no output voltage is provided. As energy storage device 28 charges to a sufficient voltage level (determined by zener diode 56 and the base-emitter junction of transistor 50), transistor 50 turns on, activating transistor 54 and latching transistor 50. At this point, energy storage device 28 is allowed to discharge through the circuitry providing a five volt regulated output 44 to an electronics system. Typically, when the application electronics to which output voltage 44 is supplied has finished its useful work, the electronics system sends a signal back at signal path 58, through resistor 60 and capacitor 62 to turn off transistor 50 and deactivate transistor 54 such that energy can once again begin to accumulate on energy storage device 28.

Figure 5A:
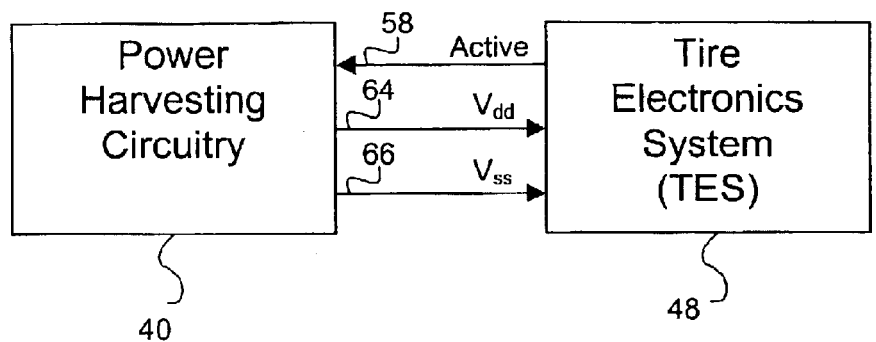
FIG. 5A provides a block diagram representation of exemplary self-powered electronics including power harvesting circuitry device and a tire electronics assembly and exemplary interaction thereof in accordance with the present subject matter.
Figure 5B:
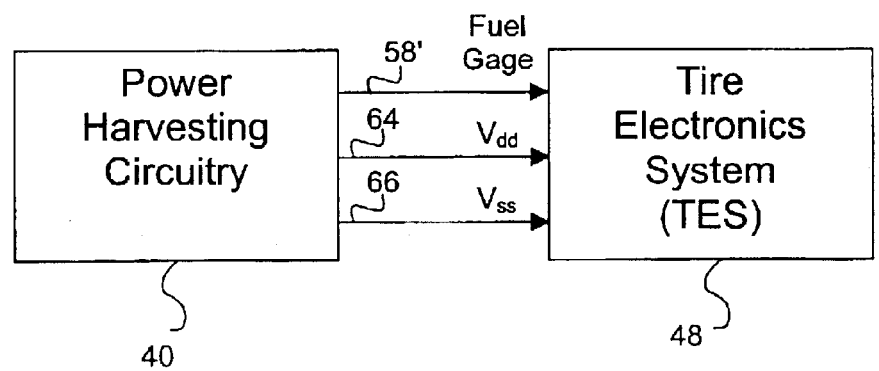
FIG. 5B provides a block diagram representation of exemplary integrated self-powered electronics including power harvesting circuitry and a tire electronics assembly and alternative exemplary interaction thereof in accordance with the present subject matter.

Energy that is stored by power harvesting circuitry 40 may be applied to a variety of components or different tire electronics assemblies in accordance with the present subject matter. FIGS. 5A and 5B, respectively, illustrate exemplary aspects of interaction between power harvesting circuitry 40 and an exemplary tire electronics system (TES) 48.

In accordance with FIG. 5A, energy is allowed to accumulate on an energy storage device in the power harvesting circuitry (for example, a capacitor or rechargeable battery) until a sufficient charge has been obtained to perform the desired functions in TES 48. Between power cycles, TES 48 remains unpowered, and thus the activation of TES 48 is governed by the rate at which energy is accumulated in the energy storage device of power harvesting circuitry 40. When sufficient energy is accumulated in the power harvesting circuitry, a supply voltage "$V_{dd}$" and ground voltage "$V_{ss}$" will be provided at paths 64 and 66 respectively to TES 48. TES 48 will return an "Active" signal along path 58 indicating electronics in TES 48 are currently functioning. When the given electronics in TES 48 are done with their respective tasks, then the "Active" signal goes low and the energy storage device 28 once again accumulates energy. This cycle will repeat as long as a tire assembly rotates at or above a given threshold speed, which may generally be about twenty kph.

In accordance with the exemplary interaction presented and discussed with reference to FIG. 5B, power harvesting circuitry continuously provides voltage "$V_{dd}$" and ground "$V_{ss}$" signals to TES 48 along with a "Fuel Gage" signal representative of the amount of energy stored in power harvesting circuitry 40. When power is applied to TES 48, a microprocessor or other suitable electronic component can periodically activate itself and monitor the Fuel Gage signal from power harvesting circuitry 40. If a sufficient amount of energy is available in energy storage device 28, then TES 48 will engage in a specified task. If a sufficient amount of energy is not available, then TES 48 will go into a low power mode where it consumes less than about one pA of power. The Fuel Gage signal is thereafter periodically checked until energy accumulation is sufficient. This cycle of waiting for sufficient energy accumulation, engaging in a specified task, and returning to low power mode is preferably repeated in a continuous fashion as long as the tire is rotating at or above a given threshold speed.

As previously mentioned, TES 48 could comprise a variety of different electronic applications depending on what sort of components are included in a tire or wheel assembly. A specific example of a tire electronics system 48 corresponds to the combination of devices depicted in FIG. 6. In particular, such electronics assembly functions as a tire monitoring system that measures temperature and pressure within a tire structure and sends the results by means of a radio frequency (RF) transmitter 68 to a remote receiver location. An example of respective transmitter and receiver modules for utilization with aspects of the disclosed technology corresponds to respective TX2 and RX2 brand UHF FM Data Transmitter and Receiver Modules such as offered for sale by Radiometrix Ltd.

A five-volt power signal "$V_{dd}$", ground signal "$V_{ss}$", and either an "Active" or "Fuel Gage" signal as discussed with reference to FIGS. 5A and 5B are preferably provided from power harvesting circuitry to a microcontroller 70. An example of a suitable microcontroller for use with the disclosed technology is a Microchip brand PIC16LF876 28-pin CMOS RISC microcontroller. Microcontroller 70 is activated when power is applied at input path 64 and then applies power to both temperature sensor 72 and pressure sensor 74 (as well as any additional sensors or appropriate electronic devices in TES 12). An example of a temperature sensor 72 suitable for utilization with the disclosed technology is a LM50 SOT-23 Single-Supply Centigrade Temperature Sensor such as offered for sale by National Semiconductor. An example of a pressure sensor 74 suitable for utilization with the disclosed technology is a Model 1471 PC Board Mountable Pressure Sensor such as offered for sale by ICSensors and Measurement Specialties Inc. Alternatively, a surface acoustic wave (SAW) device may be employed to measure both temperature and pressure at a given location. Additional sensors 76, 78 and 80, respectively, may measure additional characteristics of a tire structure or corresponding wheel assembly. In accordance with the present subject matter, a condition-responsive device is intended to include sensors, acoustic devices, and other components that provide some sort of output in response to change in input conditions.

Figure 6:
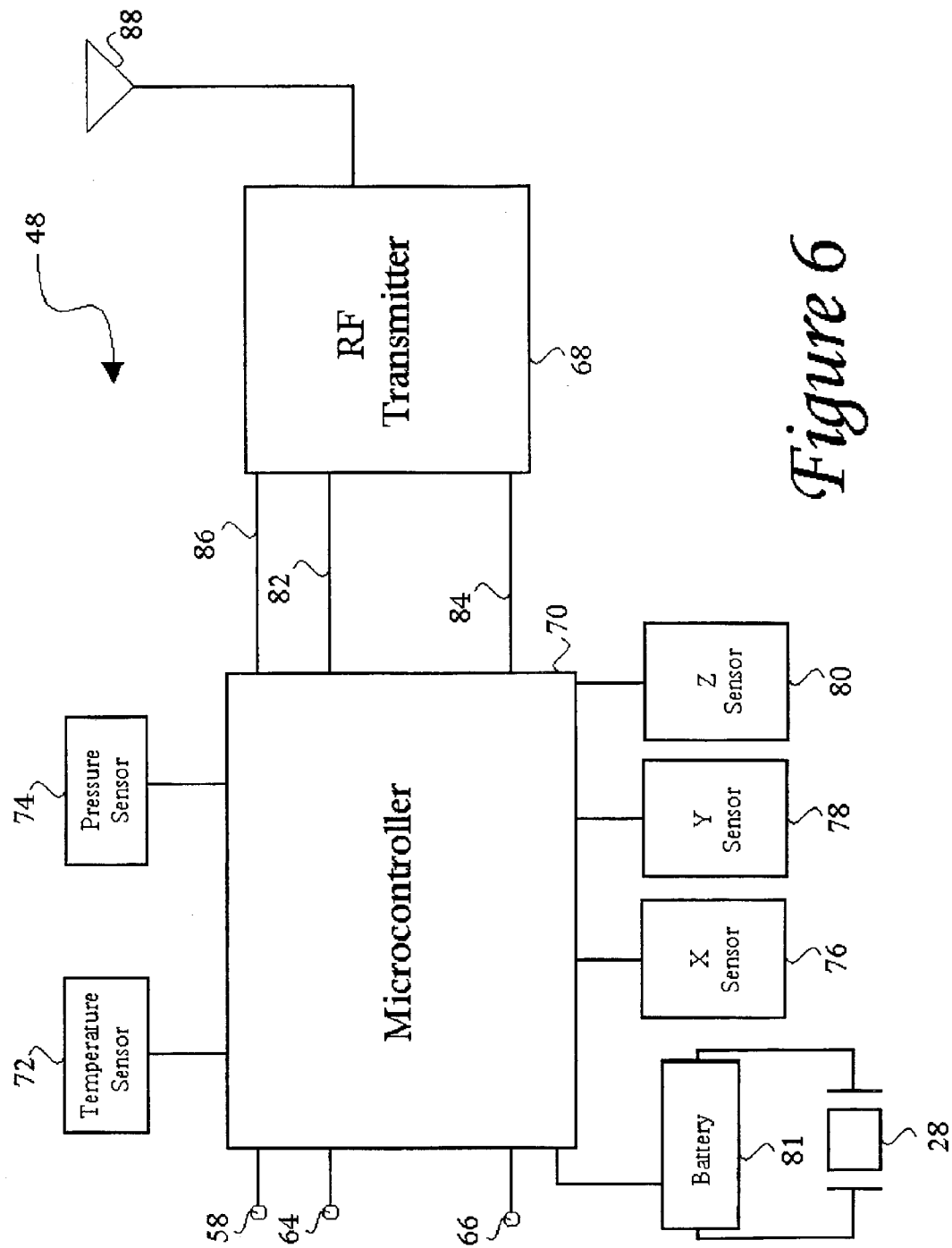
FIG. 6 provides a block diagram representation of an exemplary tire electronics assembly in accordance with the disclosed technology.

Yet another component of the exemplary TES embodiment 48 of FIG. 6 corresponds to a rechargeable battery 81 that may also be configured to receive electric charge stored in energy storage device 28 and to store additional energy for the integrated tire electronics or other electronic devices in a vehicle. An example of a rechargeable battery for use with the present subject matter is a LiteStar brand solid-state rechargeable battery such as offered for sale by Infinite Power Solutions. Energy stored in battery 81 can typically be stored for a much longer period of time than in an energy storage device such as a capacitor, thus it may be ideal to use the rechargeable battery or the rechargeable battery in combination with a capacitor. Energy stored in battery 81 can be provided to microcontroller 70 when not enough power is being stored in energy storage generated by actuation of the piezoelectric fibers. Such a situation could occur, for instance, when the vehicle is stationary or when the tires are removed from a vehicle. For example, stored energy may be needed to power TES 48 when a ground crew checks the air pressure in stationary tires on a commercial airliner. Also, battery 81 may serve to provide power to TES 48 such that information for managing tire inventories or retreads is available when a tire is removed from the vehicle.

With further reference to the exemplary TES embodiment 48 of FIG. 6, microcontroller 70 preferably includes an analog-to-digital (A/D) converter that receives information from sensors 72 through 80, respectively, and converts it to is digital information. Microcontroller 70 also comprises memory, preferably non-volatile EEPROM, which stores a unique identification tag that provides sufficient information to identify the tire or wheel assembly. Such an identification variable may be especially useful in tracking tires and vehicles in commercial applications such as trucking fleets, airplanes, etc. Once the desired information, such as that provided by sensors 72 through 80 respectively, is acquired by microcontroller 70 and converted to digital information, microcontroller 70 preferably shuts off power to the sensors and turns on power to RF transmitter 68 at lines 82 and 84 respectively. The desired digitized information is then output on data line 86 to RF transmitter 68, where the data is modulated onto an FM carrier signal and transmitted via antenna 88 to a remote receiver location.

Additional embodiments of tire electronics assemblies that may be powered via the subject power harvesting technology may correspond to a combination of many fewer components than the exemplary TES embodiment 48 of FIG. 6 or even to a single component, such as a revolution counter, a single condition-responsive device, a rechargeable battery or a flashing light device.

Figure 7:
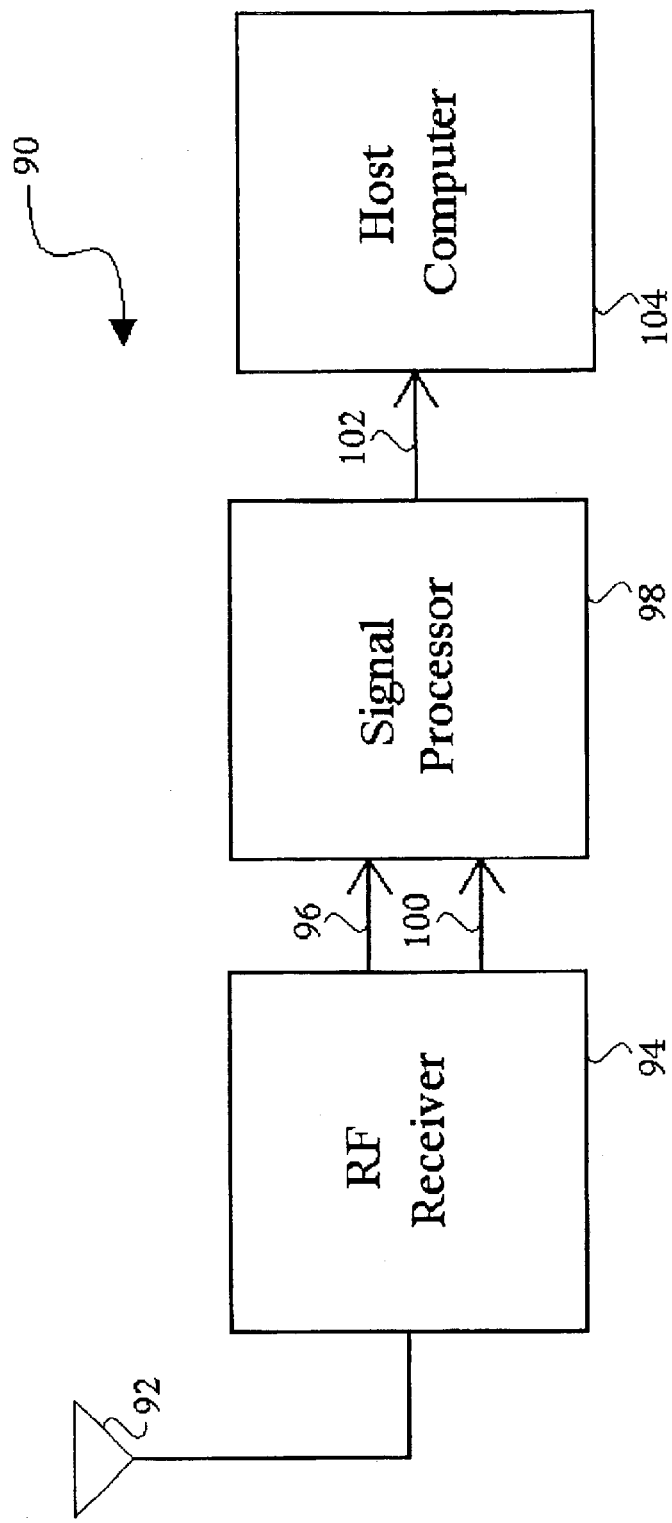
FIG. 7 provides a block diagram representation of an exemplary remote receiver configuration in accordance with the present subject matter.

A vehicle employing tire assemblies with self-powered electronics that include some sort of transmitter device is preferably equipped with a single receiver for obtaining the wirelessly transmitted information from each tire assembly. FIG. 7 provides a block diagram representation of an exemplary remote receiver configuration 90 in accordance with the present subject matter. Receiver antenna 92 facilitates receipt of information transmitted from each wheel assembly and relays the information to RF receiver 94, where the received information is demodulated from its carrier signal and provided on path 96 to signal processor 98. A carrier detection signal is also provided from RF receiver 94 to signal processor 98 via signal path 100. The data outputted from RF receiver 94 and the carrier detection signal are preferably multiplied together in signal processor 98 such that a signal without spurious noise is obtained. This data signal with reduced error probability is then preferably routed to a driver circuit that converts the digital signal to a signal with voltage levels suitable for transmission via an RS232 interface 102 to a host computer 104. Terminal emulation software is preferably provided at host computer 104 such that the data received via RS232 interface 102 is converted to information readily usable by an end user, such as that provided on a readable display module.

It should be appreciated in accordance with the disclosed technology that other electronic devices other than those specifically disclosed in the present specification may be utilized with the subject power generation technology. For instance, it may be desired to transmit other types of information other than temperature, pressure and identification to a remote location. Examples include the number of tire revolutions, amount of tire deflection, vehicle speed, and level of static and dynamic forces acting on a tire structure. U.S. Pat. No. 5,749,984 discloses other aspects of a tire monitoring system that may be employed with the present subject matter, and such patent is incorporated herein by reference for all purposes. A tire electronics system may be coupled with a global positioning system (CPS) to pinpoint a vehicle's precise location. Harvested power may alternatively be utilized to power light assemblies or feedback systems in a wheel assembly. The number of electronics applications capable of being powered in accordance with aspects of the disclosed technology are vastly numerous and should in no way be limiting to the present subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire assembly configured to store electric charge accumulated during rotation of a pneumatic tire structure, said tire assembly comprising:

a pneumatic tire structure characterized by a crown having an exterior tread portion for making contact with a ground surface, bead portions for seating said pneumatic tire structure to a wheel rim, sidewall portions extending between each bead portion and the crown, and an inner liner;

a portion of conductive material interposed in the space between said inner liner and said exterior tread portion for at least partially forming a conductivity path through which electric charge accumulated in said pneumatic tire structure can flow to a ground surface in contact with said exterior tread portion; and an energy storage device coupled to said portion of conductive material for further forming said conductivity path through which electric charge accumulated in said tire structure can flow, wherein said energy storage device is configured to store therein selected of said electric charge flowing through said conductivity path.

2. A tire assembly as in claim 1, wherein said energy storage device comprises a capacitor.

3. A tire assembly as in claim 1, wherein said energy storage device comprises a rechargeable battery.

4. A tire assembly as in claim 1, further comprising a diode coupled to said energy storage device for preventing electric charge stored in said energy storage device from reverse discharging.

5. A tire assembly as in claim 1, further comprising a zener diode provided in parallel with said energy storage device for forming in combination with said portion of conductive material an alternate conductivity path through which electric charge can flow when a predetermined amount of electric charge is already stored in said energy storage device.

6. A tire assembly as in claim 1, further comprising at least one condition-responsive device for determining information about preselected tire conditions, wherein said at least one condition-responsive device is powered by the electric charge stored in said energy storage device.

7. A tire assembly as in claim 1, further comprising a revolution counter for determining the number of revolutions made by said pneumatic tire structure, wherein said revolution counter is powered by the electric charge stored in said energy storage device.

8. A tire assembly as in claim 1, further comprising a lining of insulative material provided adjacent to selected areas of said portion of conductive material and said energy storage device to further restrict the flow of electric charge within said conductivity path.

9. A tire assembly as in claim 1, further comprising:
   additional portions of conductive material interposed in the space between said inner liner and said exterior tread portion for at least partially forming a plurality of conductivity paths through which electric charge accumulated in said pneumatic tire structure can flow to a ground surface in contact with said exterior tread portion; and
   an energy storage device coupled to selected of said portions of conductive material for further forming respective said conductivity paths through which electric charge accumulated in said tire structure can flow, wherein each said energy storage device is configured to store therein selected of said electric charge flowing through said respective conductivity paths.

10. A tire assembly configured to store electric charge accumulated during rotation of a pneumatic tire structure, said tire assembly comprising:
    a pneumatic tire structure characterized by a crown having an exterior tread portion for making contact with a ground surface, bead portions for seating said pneumatic tire structure to a wheel rim, sidewall portions extending between each bead portion and the crown, and an inner liner;
    a portion of conductive material extending between said inner liner and said exterior tread portion for at least partially forming a conductivity path through which electric charge accumulated in said pneumatic tire structure can flow to a ground surface in contact with said exterior tread portion;
    an energy storage device and a diode coupled to said portion of conductive material for further forming said conductivity path through which electric charge accumulated in said tire structure can flow, wherein said energy storage device is configured to store therein selected of said electric charge flowing through said conductivity path; and
    a lining of insulative material provided adjacent to selected portions of said strip of conductive material and said energy storage device to further restrict the flow of electric charge within said conductivity path.

11. A tire assembly as in claim 10, wherein said energy storage device comprises a capacitor.

12. A tire assembly as in claim 10, wherein said energy storage device comprises a rechargeable battery.

13. A tire assembly as in claim 10, wherein said diode is coupled in series with said energy storage device for preventing electric charge stored in said energy storage device from reverse discharging.

14. A tire assembly as in claim 10, wherein said diode comprises a zener diode provided in parallel with said energy storage device for forming in combination with said portion of conductive material an alternate conductivity path through which electric charge can flow when a predetermined amount of electric charge is already stored in said energy storage device.

15. A tire assembly as in claim 10, wherein said diode is coupled in series with said energy storage device for preventing electric charge stored in said energy storage device from reverse discharging, and wherein said tire assembly further comprises a zener diode provided in parallel with said energy storage device.

16. A tire assembly as in claim 10, further comprising:
    at least one condition-responsive device for determining information about preselected tire conditions, wherein said at least one condition-responsive device is powered by the electric charge stored in said energy storage device; and
    an antenna coupled to said at least one condition-responsive device for radiating and receiving radio frequency (RF) signals representative of said information about preselected tire conditions determined by said at least one condition-responsive device.

17. A tire assembly as in claim 10, wherein a selected portion of said exterior tread portion of said pneumatic tire structure comprises a conductive material underneath which is provided a relatively nonconductive material, and wherein said portion of conductive material defining a conductivity path is connected to the conductive selected portion of said exterior tread portion.

18. A tire assembly as in claim 10, further comprising:
    at least one electronic component coupled to said energy storage device such that the electric charge stored in said energy storage device powers said at least one electronic component; and
    a power conditioning module coupled to said energy storage device for receiving electric charge stored in said energy storage device and for providing a regulated voltage output to said at least one electronic component.

19. A method for harvesting power from a rotating tire's static electricity, said method comprising the following steps:
    providing a tire structure characterized by a crown having a tread portion for making contact with a ground surface, bead portions for seating said tire structure to a wheel rim, sidewall portions extending between each bead portion and the crown, and an inner liner, wherein said tire structure further includes at least one portion of conductive material interposed between said interior crown surface and said tread portion for forming a conductivity path through which electric charge accumulated in said tire structure can flow to a ground surface in contact with said tread portion;
    rotating said tire structure whereby the tread portion of said tire structure is in contact with a ground surface, wherein said rotating step generates static charge within said tire structure that subsequently flows through said at least one portion of conductive material; and
    storing some of the static charge generated via said rotating step in an energy storage device.

20. A method for harvesting power as in claim 19, further comprising the step of conditioning the static charge stored in said energy storage device to produce a regulated output voltage.

21. A method for harvesting power as in claim 19, further comprising the step of preventing static charge stored in an energy storage device via said storing step from discharging from the energy storage device.

22. A method for harvesting power as in claim 19, further comprising the step of further restricting the flow of static charge to a ground surface via only the conductivity path defined by said at least one portion of conductive material by providing insulator material around said conductivity path.

23. A tire assembly with self-powered electronic components, said tire assembly comprising:
- a pneumatic tire structure characterized by a crown having an exterior tread portion for making contact with a ground surface, bead portions for seating said pneumatic tire structure to a wheel rim, sidewall portions extending between each bead portion and the crown, and interior crown and sidewall surfaces;
- at least one portion of conductive material interposed in the space between an interior surface and said exterior tread portion for at least partially forming a conductivity path through which electric charge accumulated in said pneumatic tire structure can flow to a ground surface in contact with said exterior tread portion; and
- at least one electronic component coupled to said conductivity path, wherein said at least one electronic component is powered by the electric charge that flows through said conductivity path.

24. A tire assembly as in claim 23, wherein said at least one electronic component comprises a condition-responsive device for determining information about preselected tire conditions.

25. A tire assembly as in claim 24, further comprising an antenna coupled to said at least one condition-responsive device for radiating and receiving radio frequency (RF) signals representative of said information about preselected tire conditions determined by said at least one condition-responsive device.

26. A tire assembly as in claim 24, wherein said at least one condition-responsive device provides information about the temperature and pressure within said pneumatic tire structure.

27. A tire assembly as in claim 24, further comprising a microcontroller powered by the electric charge that flows through said conductivity path and coupled to said at least one condition-responsive device for processing information received from said at least one condition-responsive device and for generating select information indicative of said preselected tire conditions.

28. A tire assembly as in claim 27, further comprising an RF transmitter coupled to said microcontroller for receiving select information from said microcontroller, modulating the select information to a carrier signal, and transmitting the select information via said antenna to a remote receiver location.

29. A tire assembly as in claim 23, wherein said at least one electronic component comprises a revolution counter for determining the number of revolutions made by said pneumatic tire structure, wherein said revolution counter is powered by the electric charge that flows through said conductivity path.

30. A tire assembly as in claim 23, further comprising an energy storage device configured to receive and store selected amounts of the electric charge channeled through said conductivity path, and wherein said at least one electronic component is provided energy from said energy storage device.

* * * * *